July 3, 1923.

D. A. CAMERON

BODY FOR CHILDREN'S VEHICLES

Filed May 12, 1922

WITNESSES

INVENTOR
D. A. Cameron
BY
ATTORNEYS

July 3, 1923.
D. A. CAMERON
BODY FOR CHILDREN'S VEHICLES
Filed May 12, 1922
1,460,944
2 Sheets-Sheet 2
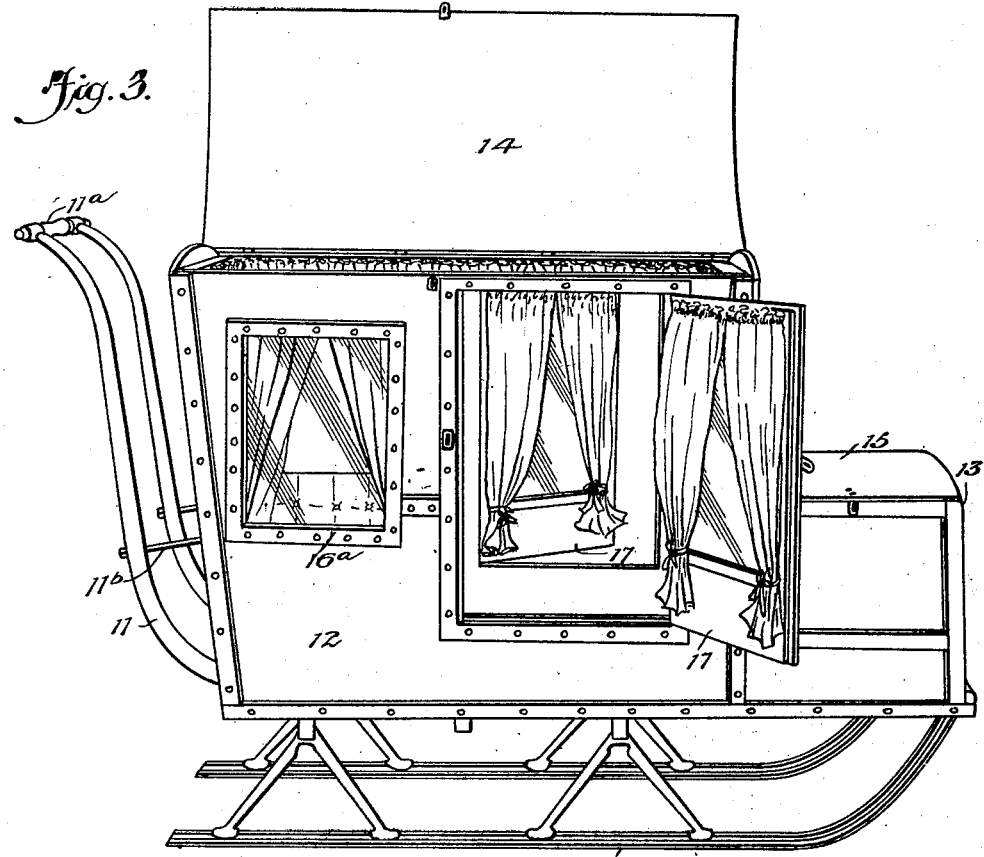
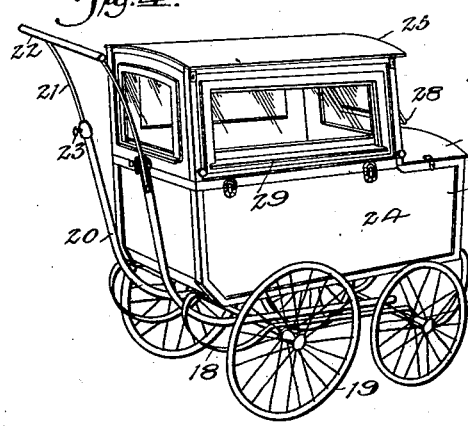
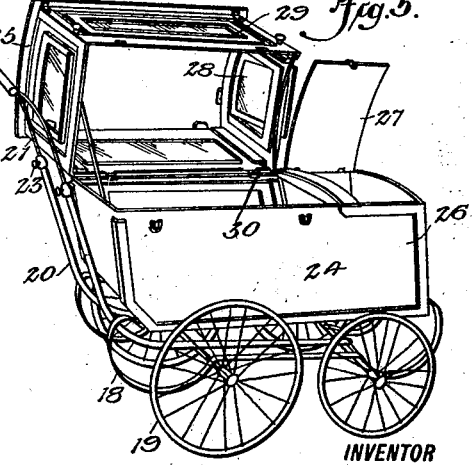

Patented July 3, 1923.

1,460,944

UNITED STATES PATENT OFFICE.

DONALD A. CAMERON, OF HOUGHTON, MICHIGAN.

BODY FOR CHILDREN'S VEHICLES.

Application filed May 12, 1922. Serial No. 560,309.

*To all whom it may concern:*

Be it known that I, DONALD A. CAMERON, a citizen of the United States, and a resident of Houghton, in the county of Houghton and State of Michigan, have invented a new and Improved Body for Children's Vehicles, of which the following is a description.

My invention relates to a top or body adapted to be applied to a sled or to the running gear of a baby carriage or the like and having the general character of the body of an automobile.

The general object of the invention is to provide a body arranged for the convenient placing and removal of a child and having provision for an ample supply of fresh air, as well as provided with a stowage box, the whole being so arranged as to present a desirable appearance and embody features adapting it particularly well for its purpose.

The nature of the invention, its distinguishing features and advantages will clearly appear as the description proceeds.

Reference is to be had to the accompanying drawings forming a part of this specification, it being understood that the drawings are merely illustrative of examples of the invention.

Figure 3 is a side perspective view of said assemblage;

Figure 4 is a perspective view showing an embodiment of my invention associated with the running gear of a baby carriage, the view showing the body closed;

Figure 5 is a view similar to Figure 4 with the body opened.

Figure 1:
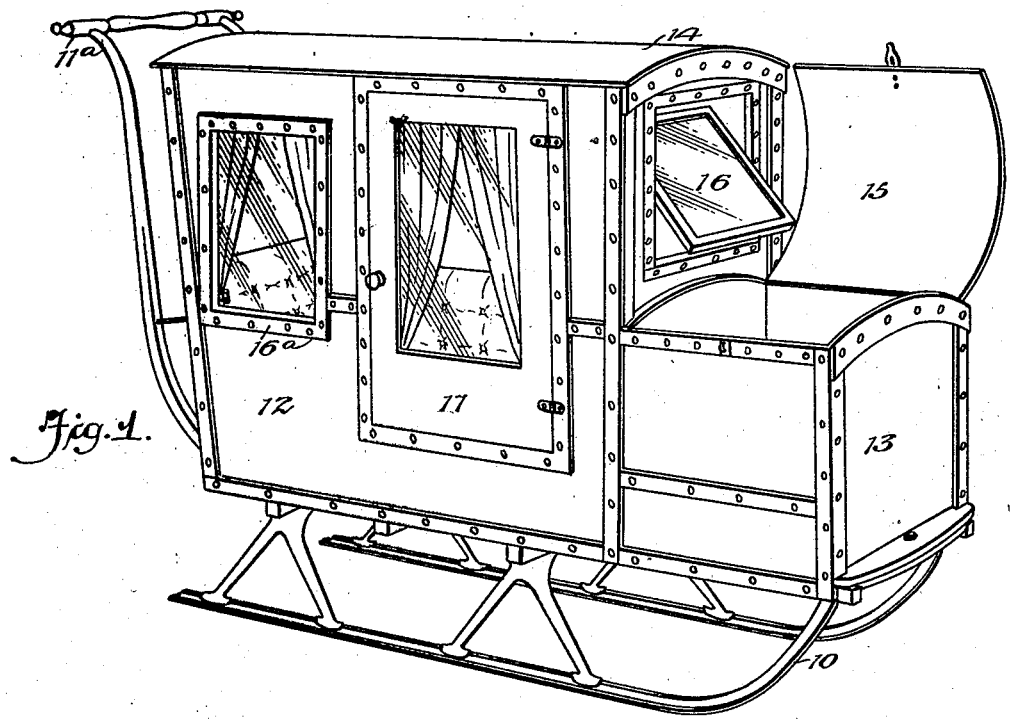
Figure 1 is a front perspective view of a top or body embodying my invention showing the same applied to a sled.
Figure 2:
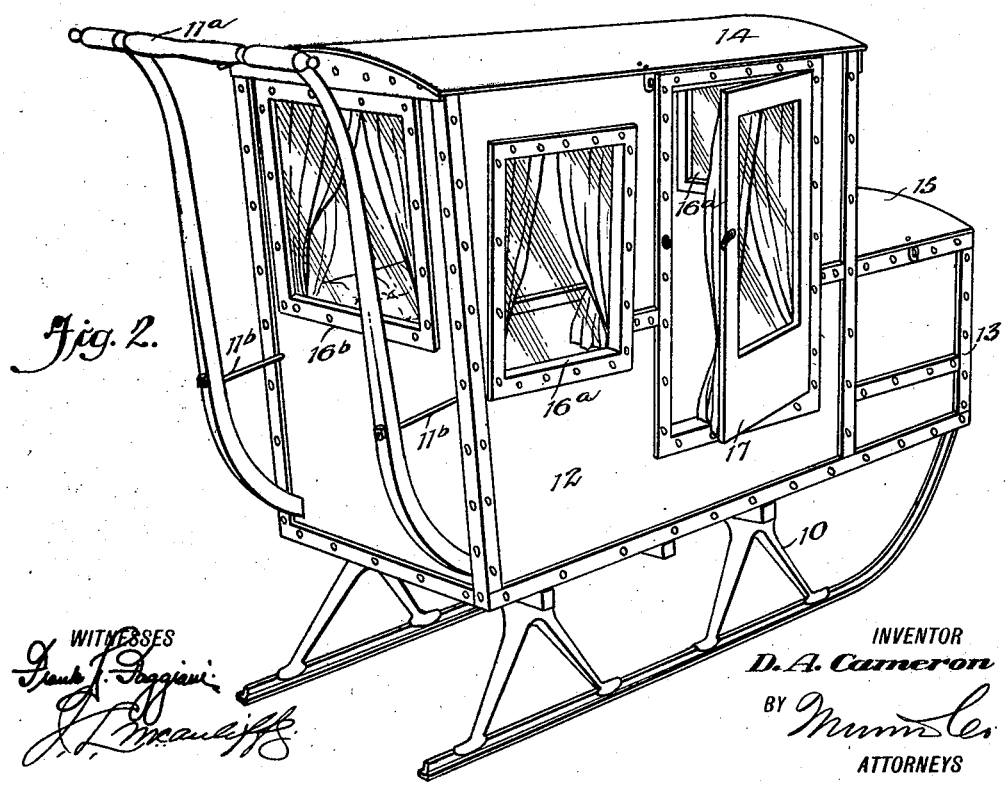
Figure 2 is a rear perspective view of the assemblage shown in Figure 1.

Referring to Figures 1 to 3, the improved body is shown placed upon an ordinary sled 10. Said body is provided with handles 11 rigid therewith at the rear end and joined by a rigid cross bar 11ª similar to the handles of baby carriages.

Bolts 11ᵇ extend through the handles and forwardly through the back of the body. The body includes a main structure 12 and an extension structure 13 at the front, of less height than said main structure. The main structure 12 has in practice a lift cover or roof 14 and the extension structure 13 has a lift cover 15, both covers being hinged along one side edge.

In the front of the main structure 12 is a window 16 preferably pivoted at its side edges in the manner of a windshield and adapted to be opened to permit ventilation or to be closed to prevent entrance of rain. The window 16 is above the top 15 of the extension structure 13 so that said extension in no way impedes the entrance of air to the main structure 12. At the same time the extension may be said to represent a conventionalized motor hood while the main structure 12 simulates the body proper of an automobile. Side windows 16ª are also provided in the main structure 12 as well as a rear window 16ᵇ. Side doors 17 are provided in the structure 12 and the child or its belongings may be placed or removed through a door 17 or through the top 14.

The extension 13 forms a convenient stowage compartment as well as contributing to the aesthetic appearance of the body.

In Figures 4 and 5 the body is mounted on the springs 18 of a baby carriage running gear, the latter having wheels and a handle 20 which in this instance has telescoping side bars 21 united by a rigid cross handle bar 22. Set screws 23 serve to hold the extension side bars 21 in given adjustment, said bars being sufficiently resilient to enter the tubular side members 20 of the handle.

The body 24 has the upper structure 25 thereof hinged at one side with a body as at 30, the hinge section having a front window 28 hinged to be open and closed and provided with suitable side windows 29. The front extension 26 corresponding with the front extension 13 has a hinge lift cover 27 corresponding with the cover 15, said extension 26 forming a stowage compartment.

I would state in conclusion that while the illustrated examples constitute practical embodiments of my invention, I do not limit myself strictly to the exact details herein illustrated, since, manifestly, the same can be considerably varied without departure from the spirit of the invention as defined in the appended claims.

Having thus described my invention, I claim:

1. As a new article of manufacture, a children's carriage comprising a sled, a closed body simulating an automobile body carried by said sled and directly secured to the knees thereof, and a substantially flat hinged top on said body.

2. As a new article of manufacture a sled and a baby carriage body mounted on the sled and secured to the knees thereof, a hinged top on said body and doors at the sides of the body.

3. In a baby carriage of the class described a sled, a baby carriage body mounted on the frame of said sled, doors on said body, a hinged top on said body, said body having a lower front structure to simulate the body of an automobile.

4. As a new article of manufacture, a vehicle for children, said vehicle comprising a body in simulation of a closed automobile body and provided with a top in imitation of the roof of an automobile and hinged at one edge to be lifted for the entrance and removal of a child, and means to mount said body directly on the knees of a sled.

DONALD A. CAMERON.